United States Patent
Tamanini et al.

(10) Patent No.: US 12,553,617 B2
(45) Date of Patent: Feb. 17, 2026

(54) GLASS BREAKAGE MITIGATION USING SILICONE RUBBER OR SIMILAR MATERIAL

(71) Applicant: WHIRLPOOL CORPORATION, Benton Harbor, MI (US)

(72) Inventors: Rodrigo Tamanini, Joinville (BR); Ramiro Ruthes, Jr., Joinville (BR); Luciano P. Nothen, Joinville (BR); Rodrigo Schultz, Joinville (BR); Javier M. Ballesteros, Joinville (BR); Cristiano M. Diman, Rio Claro (BR)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1052 days.

(21) Appl. No.: 17/591,973

(22) Filed: Feb. 3, 2022

(65) Prior Publication Data
US 2023/0243514 A1    Aug. 3, 2023

(51) Int. Cl.
*F24C 15/10* (2006.01)
*F24C 7/08* (2006.01)
*C08L 83/04* (2006.01)

(52) U.S. Cl.
CPC ............ *F24C 15/108* (2013.01); *F24C 7/083* (2013.01); *C08L 83/04* (2013.01)

(58) Field of Classification Search
CPC ........ C08L 83/04; F24C 15/10; F24C 15/108; F24C 7/083
USPC ........................................... 219/443.1–468.2
See application file for complete search history.

(56) References Cited

U.S. PATENT DOCUMENTS

| | | | |
|---|---|---|---|
| 5,185,047 A | 2/1993 | Ray | |
| 5,390,939 A * | 2/1995 | Terauchi | E21D 11/385 277/648 |
| 5,551,103 A * | 9/1996 | Drozdowich | A47B 77/06 4/631 |
| 5,571,434 A * | 11/1996 | Cavener | F24C 7/067 219/460.1 |
| 5,768,979 A | 6/1998 | Dominique | |
| 6,281,480 B1 | 8/2001 | Haberstetter | |
| 7,281,715 B2 | 10/2007 | Boswell | |
| 7,881,593 B2 | 2/2011 | Grassi et al. | |
| 9,066,372 B2 | 6/2015 | Nakayama et al. | |
| 2003/0231983 A1* | 12/2003 | Schleifer | B01L 3/50853 264/494 |
| 2017/0023258 A1 | 1/2017 | Keum | |

FOREIGN PATENT DOCUMENTS

| | | |
|---|---|---|
| CN | 104075519 | 10/2014 |
| CN | 203815463 | 10/2014 |
| EP | 2858820 | 4/2015 |

(Continued)

*Primary Examiner* — Sang Y Paik
(74) *Attorney, Agent, or Firm* — PRICE HENEVELD LLP

(57) ABSTRACT

A glass cooktop includes a single planar glass substrate having an exposed upper surface and an interior lower surface. A perimeter is disposed about an outer edge of the single planar glass substrate. A gasket is disposed on the interior surface radially inward from the perimeter of the single planar glass substrate. The gasket is adapted to absorb energy associated with a breaking of the single planar glass substrate such that a plurality of broken sections of the single planar glass substrate are retained by the gasket.

18 Claims, 7 Drawing Sheets

(56) References Cited

FOREIGN PATENT DOCUMENTS

| | | |
|---|---|---|
| KR | 20170027562 | 3/2017 |
| KR | 101744918 | 6/2017 |
| WO | 2006104825 | 10/2006 |
| WO | 2013181505 | 12/2013 |
| WO | 2014142130 | 9/2014 |
| WO | 2016082894 | 6/2016 |

* cited by examiner

GLASS BREAKAGE MITIGATION USING SILICONE RUBBER OR SIMILAR MATERIAL

BACKGROUND OF THE DISCLOSURE

The present disclosure generally relates to a glass cooktop for kitchen ranges or kitchen countertop applications, and more specifically, to a glass cooktop having a single planar glass substrate and a gasket is disposed on the interior surface radially inward from the perimeter of the single planar glass substrate.

SUMMARY OF THE DISCLOSURE

According to one aspect of the present disclosure, a glass cooktop includes a single planar glass substrate having an exposed upper surface and an interior lower surface. A perimeter is disposed about an outer edge of the single planar glass substrate. A gasket is disposed on the interior surface radially inward from the perimeter of the single planar glass substrate. The gasket is adapted to absorb energy associated with breaking of the single planar glass substrate such that a plurality of broken sections of the single planar glass substrate are retained by the gasket.

Further features of this aspect of the present disclosure include the gasket may comprise a bead of silicone. The bead of silicone may extend about an entirety of the perimeter. The single planar glass substrate further may include a bead extending between a pair of opposed sides of single planar glass substrate. The bead of silicone may be applied robotically. The single planar glass substrate may have a substantially rectilinear configuration having four corners, wherein a one of a plurality of connectors is disposed at each of the four corners of the interior surface of the single planar glass substrate. The gasket may be disposed on the interior surface radially inward from the perimeter of the single planar glass substrate and may include four individual linear sections that each extend between an adjacent two connectors of the plurality of connectors. Each of the plurality of connectors may comprise a single-sided adhesive or a double-sided adhesive. The gasket may comprises a tape adhered to the interior surface of the single planar glass substrate.

According to another aspect of the present disclosure, a glass cooktop includes a single planar glass substrate, wherein the single planar glass substrate further includes an exterior surface and an interior surface defining a polygonal configuration having a plurality of corners. A plurality of connectors is disposed on each of the plurality of corners of the interior surface of the single planar glass substrate. A gasket is disposed on the interior surface radially inward from a perimeter of the single planar glass substrate, wherein the gasket includes a plurality of individual linear sections that each extend between an adjacent pair of the plurality of connectors.

Further features of this aspect of the present disclosure include: the plurality of connectors may comprise a single-sided adhesive or a double-sided adhesive and the gasket may comprise a tape adhered to the interior surface of the single planar glass substrate by a single-sided adhesive or a double-sided adhesive. Each of the plurality of connectors may comprise a plurality of overlapping and angularly displaced tape strips. The plurality of overlapping and angularly displaced tape strips may be set substantially orthogonally to each other. The plurality of overlapping and angularly displaced tape strips may include a tape strip set obliquely to each of the tape strips set substantially orthogonally to each other. Each of the plurality of connectors have a planar shape conforming to a geometry of a one each of the plurality of corners. The gasket may comprise a reinforcing structure; and the reinforcing structure may comprise a plurality of parallel ribs disposed along a longitudinal length of and on a planar surface of the gasket.

According to yet another aspect of the present disclosure, a method of absorbing energy associated with breaking a single planar glass substrate of a cooktop is provided, whereby a plurality of broken sections of the single planar glass substrate are retained. The method includes the steps of: providing the single planar glass substrate having an exposed upper exterior surface and a lower interior surface; disposing a gasket on the interior surface radially inward from a perimeter disposed about an outer edge of the single planar glass substrate; and installing the single planar glass substrate on the cooktop, such that the gasket is adapted to absorb energy and retain the plurality of broken sections in the single planar glass substrate in the event of glass breakage.

Further features of this aspect of the present disclosure include the step of disposing the gasket on the interior surface radially inward from a perimeter disposed about an outer edge of the single planar glass substrate may be obtained by applying the gasket as a bead of silicone about an entirety of the perimeter robotically. The method may further comprise the step of disposing a plurality of connectors on each of a plurality of corners of the interior surface of the single planar glass substrate, such that the gasket is disposed on the interior surface radially inward from a perimeter of the glass substrate, and wherein the gasket includes a plurality of individual linear sections that each extend between an adjacent pair of the plurality of connectors.

These and other features, advantages, and objects of the present disclosure will be further understood and appreciated by those skilled in the art by reference to the following specification, claims, and appended drawings.

Figure 1:
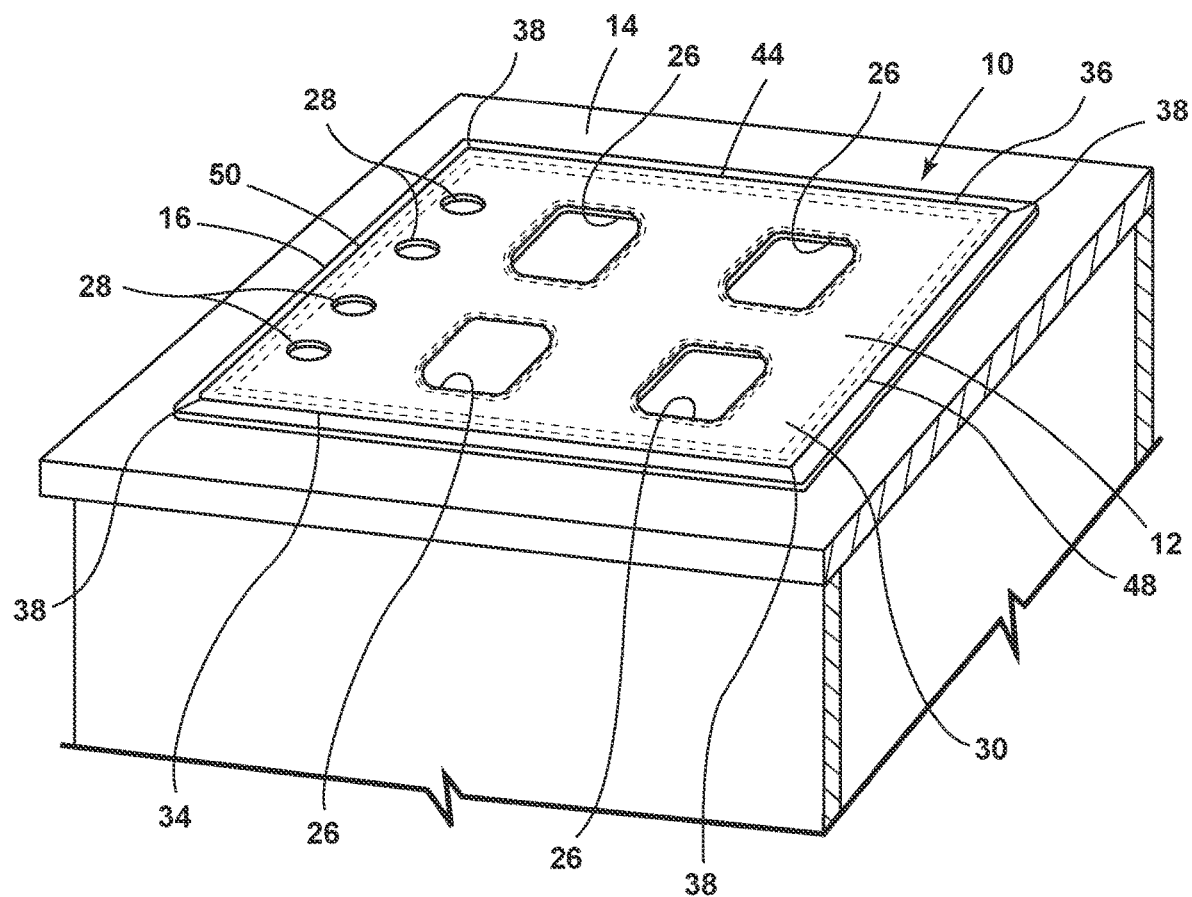
FIG. 1 is a top perspective view of the single planar glass substrate of the glass cooktop according to the present disclosure.
Figure 2:
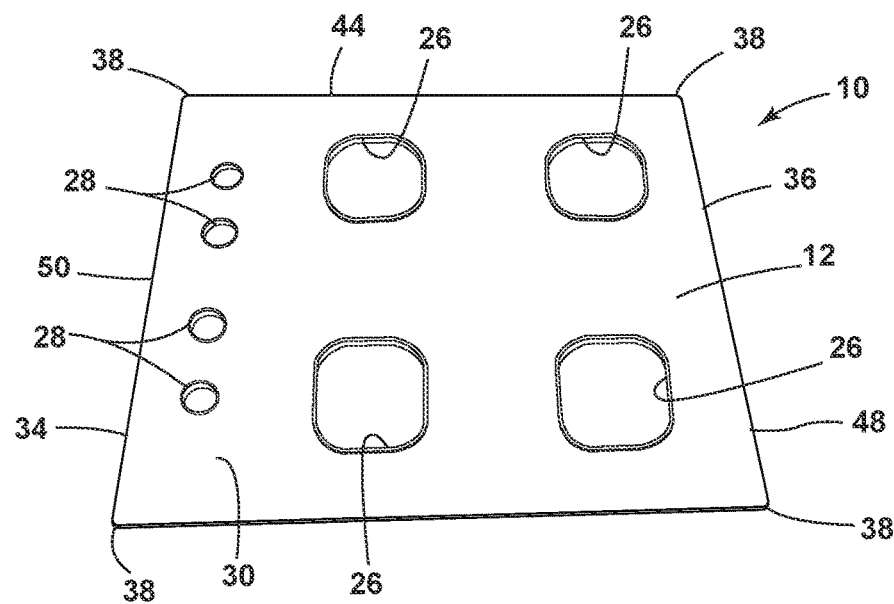
FIG. 2 is another top perspective view of the single planar glass substrate of the glass cooktop according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a single planar glass substrate of the glass cooktop. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a glass cooktop 10 that includes a single planar glass substrate 12. The glass cooktop 10 may be used in a freestanding device, such as a kitchen range with cooktop and an oven, or as a stand-alone unit mounted directly to a kitchen countertop 14, as shown in FIG. 1. As a stand-alone unit, shown in FIG. 3, a base 16 of the glass cooktop 10 may be mounted in an opening 18 in the countertop 14, with a base gasket 20 provided to prevent debris from infiltrating the installation. The single planar glass substrate 12 is disposed within a recess 22 on an upper surface 24 of the base 16 of the glass cooktop 10, as further described below.

As is typical in such glass cooktops 10, heating elements or induction elements (not shown) may be disposed below the glass cooktop 10 or, as shown, element openings 26 may be provided for the placement of such heating elements or induction elements. Similarly, control openings 28 may be provided to allow the installation of rotary controls (not shown) for turning the heating elements or induction elements on or off and for controlling the intensity of the energy output of the heating elements or induction elements, as is known. Different arrangements of the element openings 26 and the control openings 28 may be contemplated, as depicted in the Figures.

The single planar glass substrate 12 includes an upper exterior surface 30 and a lower interior surface 32. A perimeter 34 disposed about an outer edge 36 of the single planar glass substrate 12 defines the configuration of the cooktop. That is, the glass cooktop 10 and the single planar glass substrate 12 may have a polygonal configuration having a plurality of corners 38. As shown in the Figures, the single planar glass substrate 12 has a substantially rectilinear configuration having four corners 38. However, other configurations may be adopted.

Figure 3:
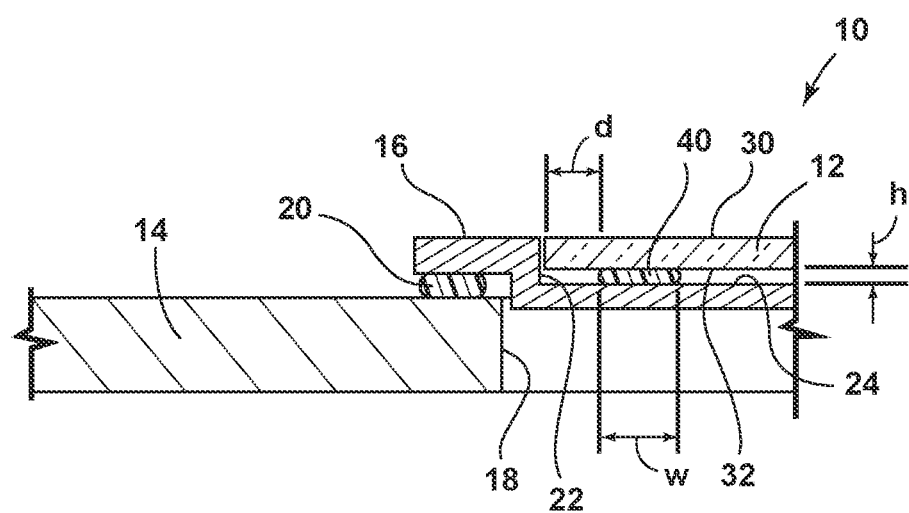
FIG. 3 is a cross-sectional view of a portion of the glass cooktop base and single planar glass substrate of the glass cooktop according to the present disclosure shown in FIG. 1.
Figure 4:
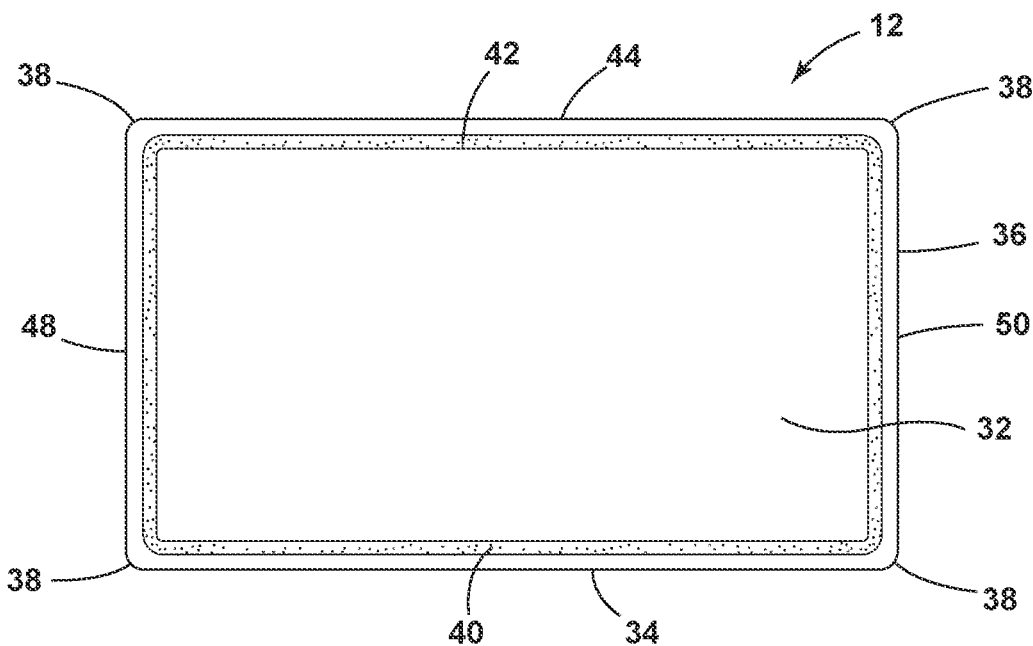
FIG. 4 is a bottom plan view of a first embodiment of the single planar glass substrate of the glass cooktop according to the present disclosure shown in FIG. 1.

A gasket 40 may be disposed on the interior surface 32 of the single planar glass substrate 12, where gasket 40 is disposed radially inward from the perimeter 34 of the single planar glass substrate 12, as perhaps best seen in FIG. 3. The radial inward distance (d) of the gasket 40 may be about 4 mm (+/−2 mm) from the outer edge 36 of the single planar glass substrate 12. Smaller distances are desired. So positioned, the gasket 40 may be adapted to absorb energy associated with a breaking of the single planar glass substrate 12, such that a plurality of broken sections of the single planar glass substrate 12 are retained by the gasket 40. The gasket 40 should not be disposed at the outer edge 36 of the single planar glass substrate 12.

In a first embodiment shown in FIGS. 1-6, the gasket 40 may be fabricated as a bead of silicone 42 extending about an entirety of the perimeter 34 of the single planar glass substrate 12. The gasket 40 may also comprise a hot melt adhesive so disposed. The gasket 40, formed as a bead of silicone 42, may have an installed width (w) of about 15 mm and an installed height (h) of about 2 mm, as again shown in FIG. 3. However, the advantages of the present invention may be also obtained where the bead of silicone 42 extends about less than the entirety of the perimeter 34, for example, the bead of silicone 42 may be omitted from one side of the single planar glass substrate 12, such as a rear side 44, which may be less likely to generate broken sections of glass during a breakage event.

Figure 5:
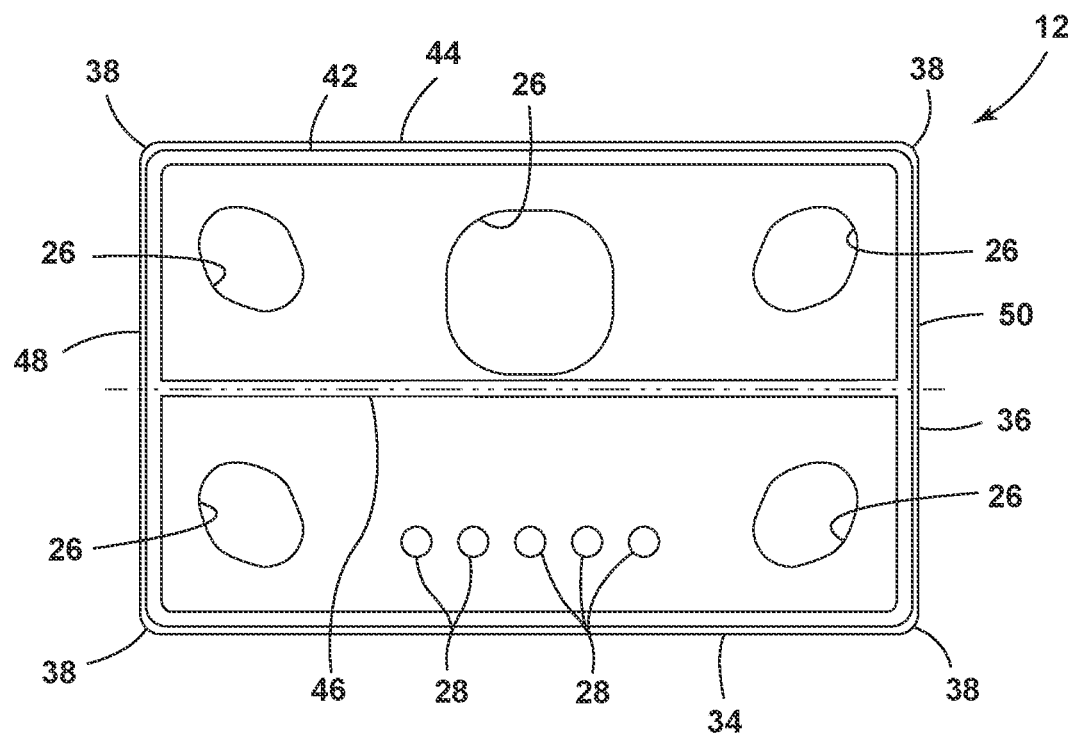
FIG. 5 is another bottom plan view of the first embodiment of the single planar glass substrate provided with a silicone bead extending between a pair of opposed sides of single planar glass substrate according to the present disclosure.
Figure 6:
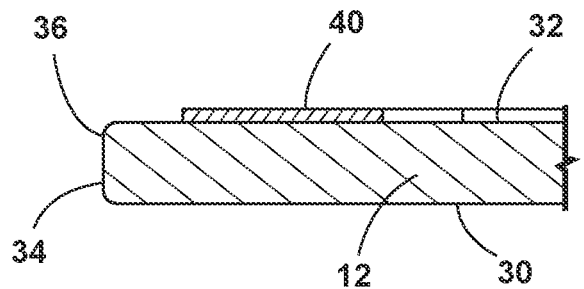
FIG. 6 is a cross-sectional bottom plan view of the silicone bead extending between a pair of opposed sides of single planar glass substrate shown in FIG. 5.
Figure 7:
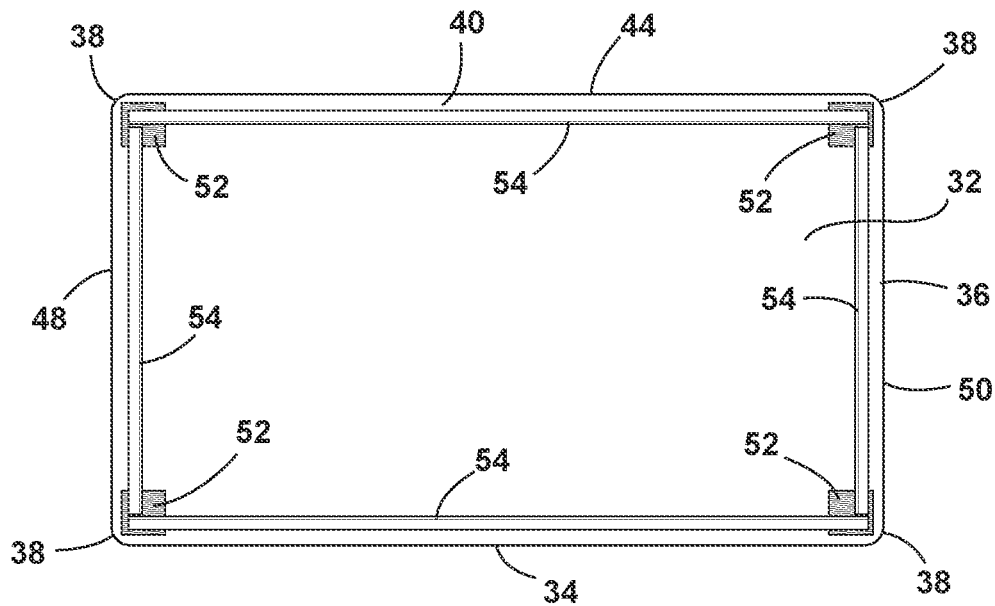
FIG. 7 is a bottom plan view of a second embodiment of the single planar glass substrate of the glass cooktop according to the present disclosure shown in FIG. 1.

The single planar glass substrate 12 may further include an additional silicone bead 46 extending between a pair of opposed sides 48, 50 of the single planar glass substrate 12, as shown in FIGS. 5 and 6. That is, for reinforcement, additional beads of silicone 46 may be added as internal links.

An advantageous feature of the present disclosure is the ability to have the gasket 40 applied robotically as the silicone bead 42. Such application technique promotes repeatability, reduces the complexity of manufacturing the cooktop, simplifies the overall process, and reduces the application time.

In a second embodiment, shown in FIGS. 7-12, a one of a plurality of connectors 52 may be disposed at each of the four corners 38 of the interior surface 32 of the single planar glass substrate 12. The gasket 40 again is disposed on the interior surface 32 radially inward from the perimeter 34 of the single planar glass substrate 12. The gasket 40 may also include a plurality of individual linear sections 54, as shown in FIGS. 7-10 as four individual linear sections 54, that each extends between an adjacent pair of connectors 52 of the plurality of connectors 52.

The individual linear sections 54 of the gasket 40 may extend about an entirety of the perimeter 34 of the single planar glass substrate 12. However, the advantages of the present invention may be also obtained where the individual linear sections 54 of the gasket 40 extend less than the about an entirety of the perimeter 34, for example, where an individual linear section 54 of the gasket 40 may be omitted from one side of the single planar glass substrate 12, such as the rear side 44, which may be less likely to generate broken sections, as shown in FIGS. 8-10.

Each of the plurality of connectors 52 may comprise a single-sided adhesive or a double-sided adhesive. Each of the plurality of individual linear sections 54 of the gasket may comprise a tape adhered to the interior surface 32 of the single planar glass substrate 12, wherein the individual linear section 54 adhered to the interior surface 32 of the single planar glass substrate 12 may also include a single-sided adhesive or a double-sided adhesive.

Figure 8:
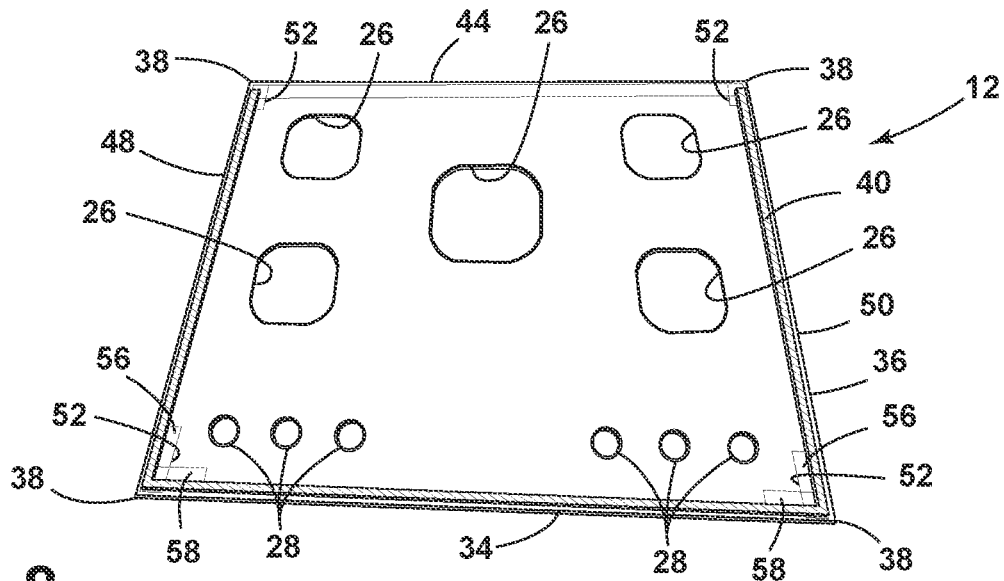
FIG. 8 is a bottom perspective view of another configuration of the second embodiment of the single planar glass substrate of the glass cooktop according to the present disclosure.
Figure 9:
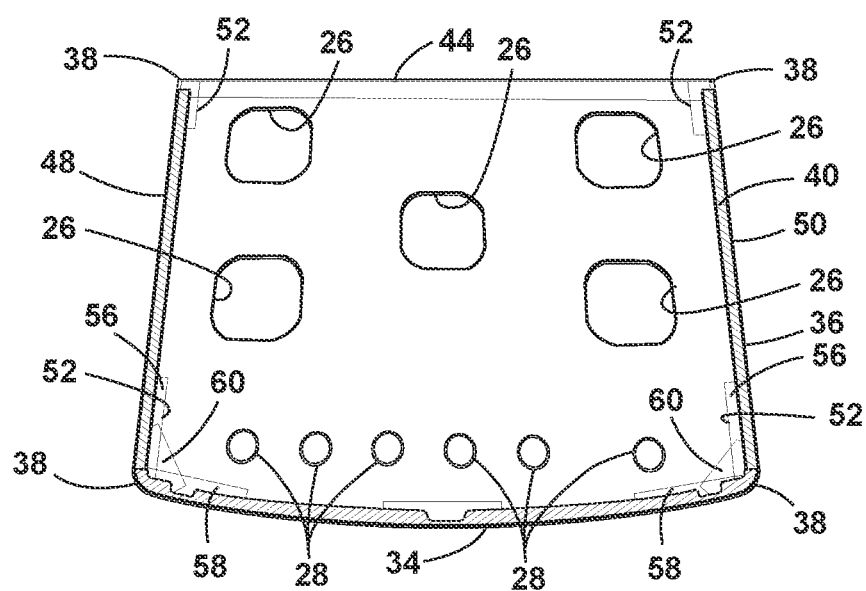
FIG. 9 is a bottom perspective view of yet another configuration of the second embodiment of the single planar glass substrate of the glass cooktop according to the present disclosure.
Figure 10:
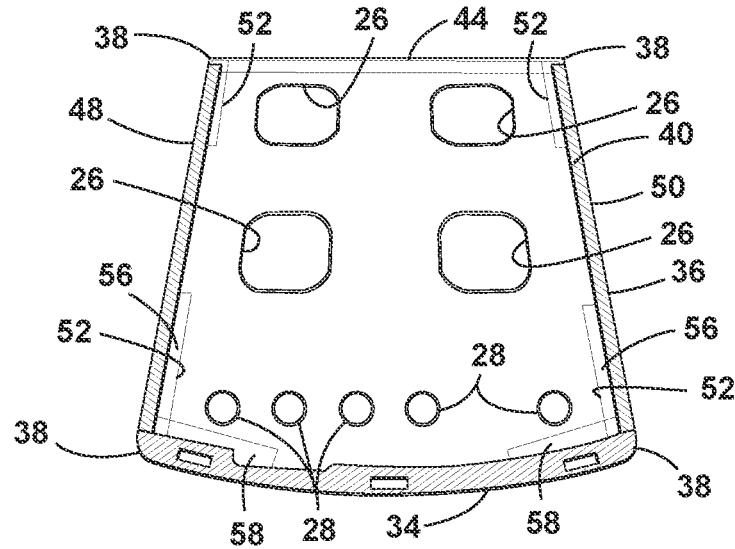
FIG. 10 is a bottom perspective view of still another configuration of the second embodiment of the single planar glass substrate of the glass cooktop according to the present disclosure.
Figure 11:
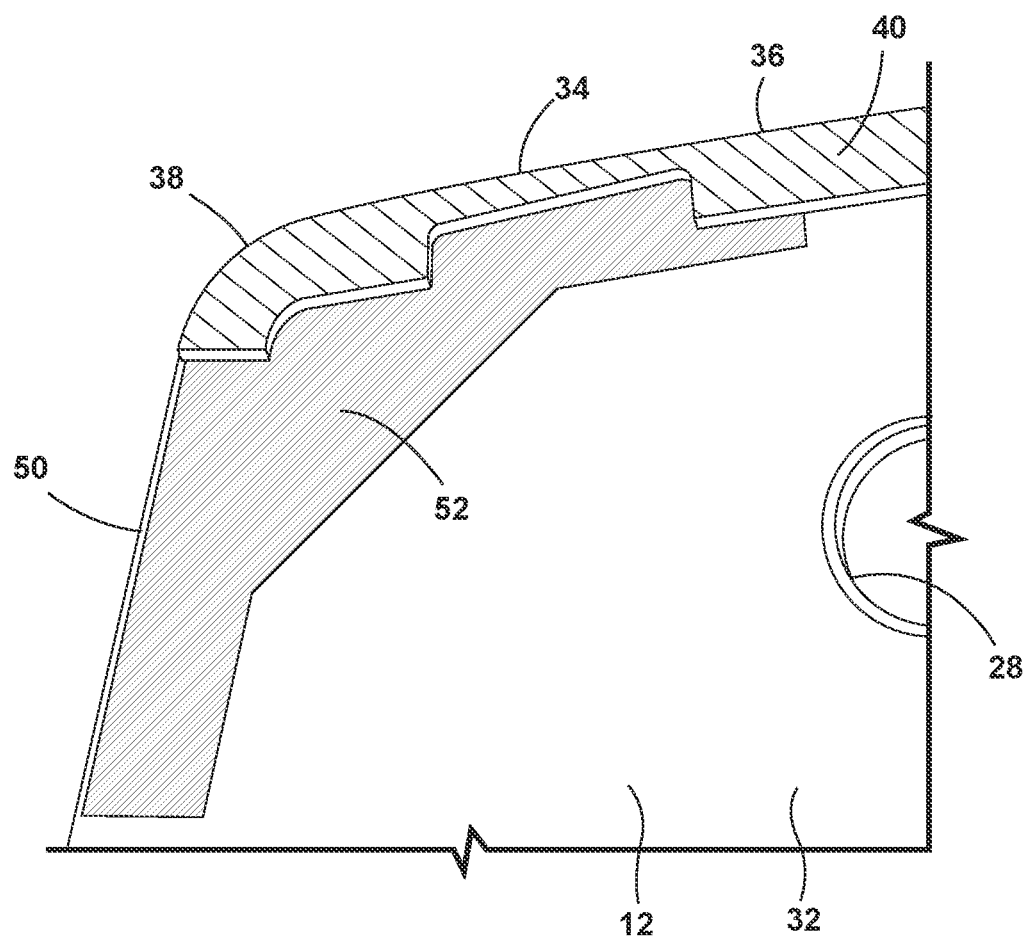
FIG. 11 is a bottom perspective view of a corner and connector of the second embodiment of the single planar glass substrate of the glass cooktop according to the present disclosure.

As shown in FIGS. 8-10, each of the plurality of connectors 52 may comprise a plurality of overlapping and angularly displaced tape strips 56, 58. The plurality of overlapping and angularly displaced tape strips 56, 58 may be set substantially orthogonally to each other. As shown in FIG. 9, the plurality of overlapping and angularly displaced tape strips 56, 58 may also include a tape strip 60 set obliquely to each of the tape strips 56, 58 set substantially orthogonally to each other. Alternatively, each of the plurality of connectors 52 may have a planar shape conforming to the geometry of each of the plurality of corners 38, as shown in FIG. 11. That is, each of the plurality of connectors 52 may have a custom and unique configuration that is formed to match the outer edge 36 of the corner 38 of the perimeter 34 of the single planar glass substrate 12, depending on its specific geometry, that is disposing radially inward from the perimeter 34, as discussed above.

Figure 12:
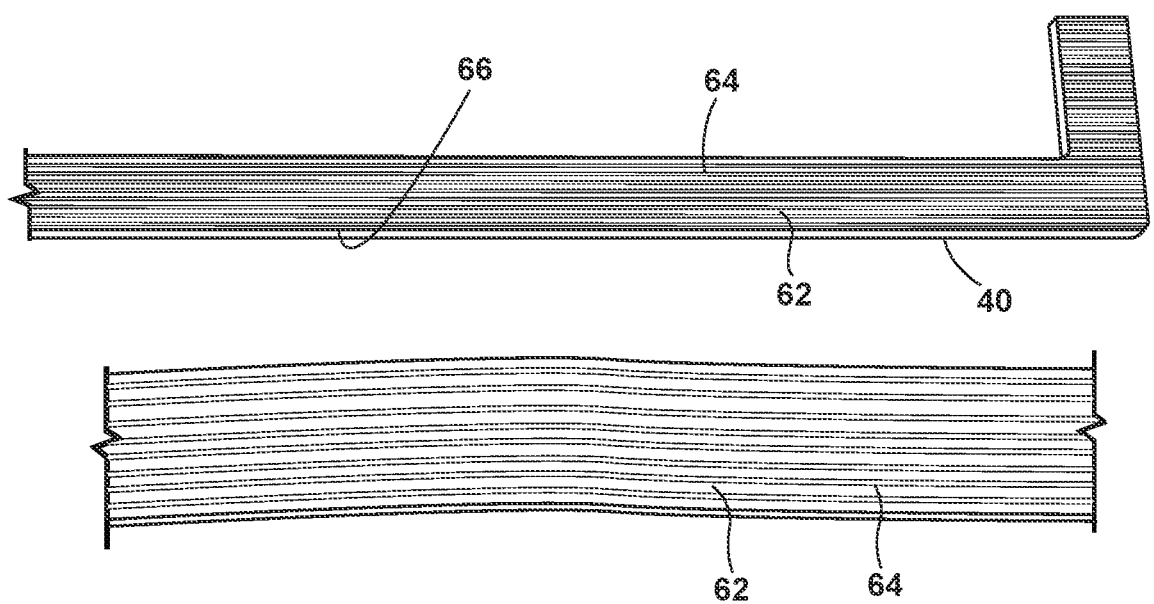
FIG. 12 is a bottom perspective and plan view of a reinforcement of one of the plurality of linear segments of the gasket of the second embodiment of the single planar glass substrate of the glass cooktop according to the present disclosure.

As seen in FIG. 12, the gasket 40 may also include a reinforcing structure 62 in order to avoid high deformation during a breakage event. The reinforcing structure 62 may include a plurality of parallel ribs 64 disposed along a longitudinal length of and on a planar surface 66 of the gasket 40.

In operation, the method of absorbing energy associated with breaking of a single planar glass substrate 12 of a glass cooktop 10, whereby a plurality of broken sections of the single planar glass substrate 12 are retained, includes the step of providing the single planar glass substrate 12 having the exposed upper exterior surface 30 and the lower interior surface 32. The method also includes the step of disposing the gasket 40 on the interior surface 32 radially inward the distance (d) from the perimeter 34 disposed about the outer edge 36 of the single planar glass substrate 12. The single planar glass substrate 12 is then installed on the glass cooktop 10, such that the gasket 40 is adapted to absorb energy and retain the plurality of broken sections in the single planar glass substrate 12 in the event of glass breakage.

The step of disposing the gasket 40 on the interior surface 32 radially inward from a perimeter 34 disposed about an outer edge 36 of the single planar glass substrate 12 may be obtained by applying the gasket 40 as the bead of silicone 42 about an entirety of the perimeter 34 robotically.

The method may further comprise the step of disposing the plurality of connectors 52 on each of the plurality of corners 38 of the interior surface 32 of the single planar glass substrate 12, such that the gasket 40 is disposed on the interior surface 32 radially inward from the perimeter 34 of the single planar glass substrate 12, and wherein the gasket 40 includes the plurality of individual linear sections 54 that each extends between an adjacent pair of the plurality of connectors 52.

As disclosed above, an objective is to contain glass shards or chips generated by a breakage of the glass cooktop 10 that might otherwise be directed toward a user of the glass cooktop 10 by retaining such glass shards or chips by the gasket 40. In the first embodiment, the gasket 40 formed as a silicone/hot melt adhesive bead 42 on the single planar glass substrate 12 absorbs the breakage energy, mitigating the hazard of fragments flying away from the glass cooktop 10. In the second embodiment, the gasket 40 is in the form of a plurality of individual linear sections 54 of single-sided tape or double-sided tape that each extends between adjacent two connectors 52 of the plurality of connectors 52, that may also be fabricated by single-sided tape or double-sided tape.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A glass cooktop comprising a base and a single planar glass substrate, wherein the single planar glass substrate further comprises;
    an exposed upper surface;
    an interior lower surface;
    a perimeter disposed about an outer edge of the single planar glass substrate and adapted to be received within a recess on an upper surface of the base of the glass cooktop;
    a gasket disposed on the interior surface radially inward from the perimeter of the single planar glass substrate; and
    a plurality of connectors on each of a plurality of corners of the interior surface of the single planar glass substrate, such that the gasket is disposed on the interior surface radially inward from a perimeter of the glass substrate;
    wherein the gasket includes a plurality of individual linear sections that each extend between an adjacent pair of the plurality of connectors; and
    wherein the gasket is adapted to absorb energy associated with a breaking of the single planar glass substrate such that the single planar glass substrate is retained in its entirety by the gasket in the event of breakage thereof.

2. The glass cooktop of claim 1, wherein the gasket comprises a silicone bead.

3. The glass cooktop of claim 2, wherein the silicone bead extends about an entirety of the perimeter.

4. The glass cooktop of claim 1, wherein the single planar glass substrate further includes a silicone bead extending between a pair of opposed sides of the single planar glass substrate.

5. The glass cooktop of claim 2, wherein the silicone bead is applied robotically.

6. The glass cooktop of claim 1, wherein the single planar glass substrate has a substantially rectilinear configuration having four corners; and
    wherein a one of a plurality of connectors is disposed at each of the four corners of the interior surface of the single planar glass substrate.

7. The glass cooktop of claim 6, wherein the gasket disposed on the interior surface radially inward from the perimeter of the single planar glass substrate comprises four individual linear sections that each extend between an adjacent two connectors of the plurality of connectors.

8. The glass cooktop of claim 7, wherein the each of the plurality of connectors comprise a single-sided adhesive or a double-sided adhesive.

9. The glass cooktop of claim 6, wherein the gasket comprises a tape adhered to the interior surface of the single planar glass substrate.

10. A glass cooktop comprising a single planar glass substrate, wherein the single planar glass substrate further comprises:
    an exterior surface and an interior surface defining a polygonal configuration having a plurality of corners;
    a plurality of connectors disposed on each of the plurality of corners of the interior surface of the single planar glass substrate; and
    a gasket disposed on the interior surface radially inward from a perimeter of the single planar glass substrate, wherein the gasket includes a plurality of individual linear sections that each extend between an adjacent pair of the plurality of connectors;
    wherein the plurality of connectors comprise a single-sided adhesive or a double-sided adhesive and the gasket comprises a tape adhered to the interior surface of the single planar glass substrate by a single-sided adhesive or a double-sided adhesive.

11. The glass cooktop of claim 10, wherein each of the plurality of connectors further comprises a plurality of overlapping and angularly displaced tape strips.

12. The glass cooktop of claim 11, wherein the plurality of overlapping and angularly displaced tape strips are set substantially orthogonally to each other.

13. The glass cooktop of claim 12, wherein the plurality of overlapping and angularly displaced tape strips include a tape strip set obliquely to each of the tape strips set substantially orthogonally to each other.

14. The glass cooktop of claim 10, wherein a one each of the plurality of connectors have a planar shape conforming to a geometry of a one each of the plurality of corners.

15. The glass cooktop of claim 10, wherein the gasket further comprises a reinforcing structure.

16. The glass cooktop of claim 15, wherein the reinforcing structure comprises a plurality of parallel ribs disposed along a longitudinal length of and on a planar surface of the gasket.

17. A method of absorbing energy associated with breaking a single planar glass substrate of a cooktop, the method comprising the steps of:
    providing the single planar glass substrate having an exposed upper exterior surface and a lower interior surface;
    disposing a gasket on the interior surface radially inward from a perimeter disposed about an outer edge of the single planar glass substrate;
    installing the single planar glass substrate within a recess on an upper surface of a base of the cooktop, such that the gasket is adapted to absorb energy and the single planar glass substrate is retained in its entirety by the gasket in the event of breakage thereof; and
    disposing a plurality of connectors on each of a plurality of corners of the interior surface of the single planar glass substrate, such that the gasket is disposed on the interior surface radially inward from a perimeter of the glass substrate, and wherein the gasket includes a plurality of individual linear sections that each extend between an adjacent pair of the plurality of connectors.

18. The method of claim 17, wherein the step of disposing the gasket on the interior surface radially inward from a perimeter disposed about an outer edge of the single planar glass substrate is obtained by applying the gasket as a bead of silicone about an entirety of the perimeter robotically.

\* \* \* \* \*